(12) United States Patent
Grossman et al.

(10) Patent No.: US 8,989,960 B2
(45) Date of Patent: Mar. 24, 2015

(54) INTERACTIVE ENGINE

(71) Applicants: Volkswagen AG, Wolfsburg (DE); Audi AG, Ingolstadt (DE)

(72) Inventors: Jack Eric Grossman, San Francisco, CA (US); Matthew Jolda, Palo Alto, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 13/826,751

(22) Filed: Mar. 14, 2013

(65) Prior Publication Data

US 2014/0277933 A1    Sep. 18, 2014

(51) Int. Cl.
*B60Q 1/26* (2006.01)

(52) U.S. Cl.
CPC .................... *B60Q 1/2619* (2013.01)
USPC .......................................... 701/36

(58) Field of Classification Search
USPC ................. 701/36; 353/11–13; 340/461, 438, 340/815.4
See application file for complete search history.

(56) References Cited

U.S. PATENT DOCUMENTS

| | | | |
|---|---|---|---|
| 2004/0193359 A1* | 9/2004 | Welch | 701/111 |
| 2006/0119475 A1 | 6/2006 | Avery, Jr. et al. | |
| 2009/0082951 A1* | 3/2009 | Graessley | 701/200 |
| 2010/0070932 A1* | 3/2010 | Hur | 715/863 |
| 2013/0030646 A1* | 1/2013 | Ellis | 701/36 |
| 2013/0141250 A1* | 6/2013 | Mathieu et al. | 340/901 |
| 2013/0183946 A1* | 7/2013 | Jeong | 455/414.1 |
| 2014/0003620 A1* | 1/2014 | Rill | 381/86 |
| 2014/0019913 A1* | 1/2014 | Newman et al. | 715/810 |
| 2014/0070933 A1* | 3/2014 | Gautama et al. | 340/438 |
| 2014/0071417 A1* | 3/2014 | Grespan et al. | 355/67 |

FOREIGN PATENT DOCUMENTS

| | | |
|---|---|---|
| DE | 10 2005 045 964 A1 | 5/2006 |
| DE | 10 2006 027 733 A1 | 12/2007 |
| DE | 10 2010 063 567 A1 | 6/2012 |
| DE | 10 2011 013 760 A1 | 9/2012 |
| KR | 2012 0025285 A | 3/2012 |

\* cited by examiner

*Primary Examiner* — Mary Cheung
*Assistant Examiner* — Rodney Butler
(74) *Attorney, Agent, or Firm* — Muncy, Geissler, Olds & Lowe, P.C.

(57) ABSTRACT

A system includes a unit configured to read information of a vehicle system, a projector configured to display the information on a surface of a vehicle, and a sensor configured to receive gesture input from a user. The information displayed on the surface of the vehicle is manipulatable based on the gesture input.

14 Claims, 11 Drawing Sheets

INTERACTIVE ENGINE

BACKGROUND OF THE INVENTION

1. Field of the Invention

The present invention relates to a vehicle engine display system and more particularly to a method and system for an interactive engine display.

2. Description of the Background Art

Premium, high-performance, low-volume sports cars are typically known as "supercars." In some circumstances, these supercars are used for racing purposes. Many owners, however, purchase such supercars for other purposes.

Indeed, many owners are merely vehicle enthusiasts whose excitement for the supercar comes from either an appreciation for the aesthetics or workmanship of the vehicle. Additionally, some owners gain excitement and pleasure merely from an emotional connection the car makes with friends and family or even the attention of strangers who see the car. Some owners and enthusiasts showcase their supercars in impromptu parking lot meetings or formal road shows. In such cases, owners are typically asked by other enthusiasts if they will open the engine cover so onlookers can take a picture, point out the various parts of the engine, or watch the intricate moving parts as the engine idles and revs.

By merely viewing an engine, it is difficult to ascertain any information regarding the engine. That is, unless one is extremely knowledgeable regarding vehicle engines, one will not be able to ascertain any information about the engine components, features, performance, or status by merely viewing the engine. Additionally, even for those highly knowledgeable, detailed information regarding the performance and/or condition of the engine cannot likely be gleaned by merely viewing the engine. For example, even a trained mechanic cannot glean specific, critical diagnostic information about the vehicle engine merely by looking at the engine.

Certain conventional systems exist for providing information regarding a vehicle engine. For example, FIG. 1 illustrates a conventional hood-mounted engine gauge 100. Such hood-mounted gauges are a primitive form of heads-up display and are typically found on vintage performance "muscle cars." The gauge 100 is typically mounted just above the vehicle engine VE. In the example in FIG. 1, the gauge 100 is a fuel gauge mounted just behind the hood outside of the engine cabin next to the windshield wipers. The gauges, however, are designed to be visible in the driver's seat and are used by the driver while the vehicle is running. The gauge 100 is not designed to showcase the engine or provide information while the vehicle is being serviced.

In another, virtual, example, a video game (i.e., "Forza Motorsport 4") features a mode in which players may walk virtually around a car, opening doors, sitting inside, etc. As illustrated in FIGS. 2 and 3, when certain parts of the car are clicked on, videos begin to play with audio narration explaining features of the car with graphical augmentations. The augmentations are of model information and performance statistics. The video game does not provide real-time diagnostic information.

Some conventional systems exist for outputting and/or displaying vehicle system information in real settings.

For example, DE 10 2005 045 964 A1 (which corresponds to U.S. Patent Application Publication No. 2006/0119475) discloses a method and system for displaying engine fault conditions in a vehicle. The system includes a plurality of sensors and actuators for monitoring vehicle operating conditions and detecting an occurrence of an engine fault condition. Information from the sensors and actuators are communicated to a console, which includes one or more visual or auditory indicators. The system in DE 10 2005 045 964 A1, however, does not provide an interactive graphical display for displaying information about a vehicle, which may be augmented in real time.

Furthermore, KR 20120025285 A discloses a digital display device for displaying information of vehicle components, including a vehicle engine. A touch screen displays information regarding the vehicle. The touch screen is controllable to display information about a vehicle component that is selected on the touch screen. The system in KR 20120025285 A does not provide an interactive graphical display for displaying information on a surface of a vehicle.

In another example, DE 10 2006 027 733 A1 discloses a system for displaying maintenance information and operating status information for a vehicle. A sensor detects maintenance/operating status information and transmits the information to an external display unit. The system in DE 10 2006 027 733 A1 does not disclose an interactive graphical display for displaying information about a vehicle, which may be augmented in real time.

DE 10 2010 063 567 discloses a system for displaying information about vehicle components. The display is mounted on an exterior of the vehicle to easily communicate information to a user outside of the vehicle. The display includes a device mounted onto the vehicle. DE 10 2010 063 567 A does not provide an interactive graphical display for displaying information on a surface of a vehicle itself or for displaying information on components within the vehicle.

Lastly, DE 10 2011 013 760 A1 discloses a system for providing information about a vehicle through an augmented reality. Specifically, information about the vehicle is transferred to and displayed on a user's mobile device.

As many power trains become hybrid or electric, the visceral excitement of loud, moving mechanical parts of a performance engine may be lost. Many components in an electric power train are hidden under the vehicle, are very quiet, and are not visually interesting. Accordingly, it is difficult to showcase an engine in such a hybrid or electric car.

Currently, there is no known system that allows a user to interact with a vehicle during display of the engine. That is, there is no known system for providing information regarding the engine (e.g., components, features, status, condition, etc.) while displaying the engine.

SUMMARY OF THE INVENTION

In view of the foregoing and other exemplary problems, drawbacks, and disadvantages of the conventional methods and structures, an exemplary feature of the method and system of the present invention is to provide a method and system in which manipulatable content may be displayed on a vehicle engine.

In accordance with a first exemplary, non-limiting aspect of the present invention, a method includes reading information of a vehicle system, displaying the information on a surface of the vehicle, accepting gesture input from a user, and manipulating the information displayed on the surface based on the gesture input.

In accordance with a second exemplary, non-limiting aspect of the present invention, a system includes a unit configured to read information of a vehicle system, a projector configured to display the information on a surface of a vehicle, and a sensor configured to receive gesture input from a user. The information displayed on the surface of the vehicle is manipulatable based on the gesture input.

In accordance with a third exemplary, non-limiting aspect of the present invention, a system includes an interactive graphical interface configured to display information of a vehicle system and a sensor configured to receive gesture input from a user. The information displayed is manipulatable based on the gesture input.

As high heat is typically generated in a engine bay, the gesture-based interaction of the present system and method allows users (e.g., vehicle owners, enthusiasts, technicians) to interact with an engine without having to contact the engine, thus avoiding the risk of getting burned.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Figure 1:
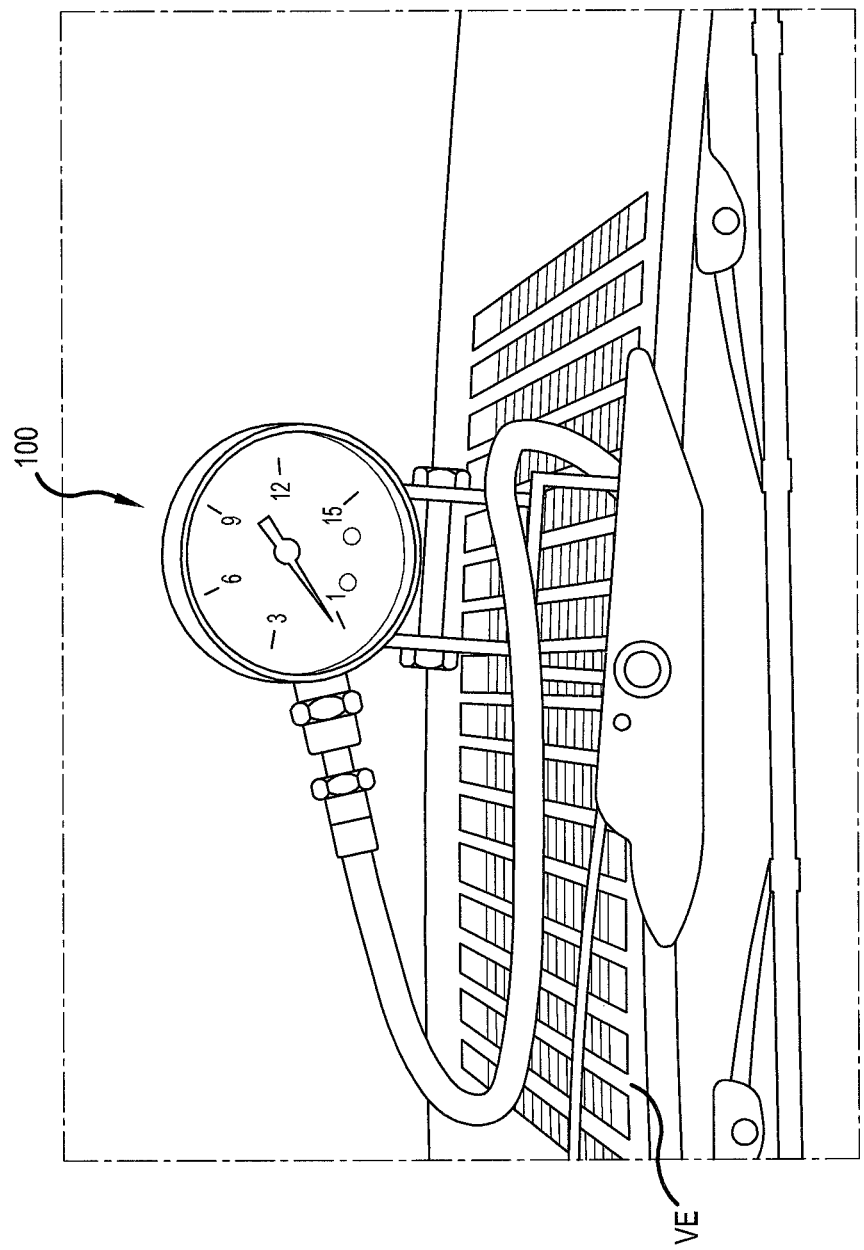
FIG. 1 illustrates a conventional hood-mounted engine gauge 100.
Figure 2:
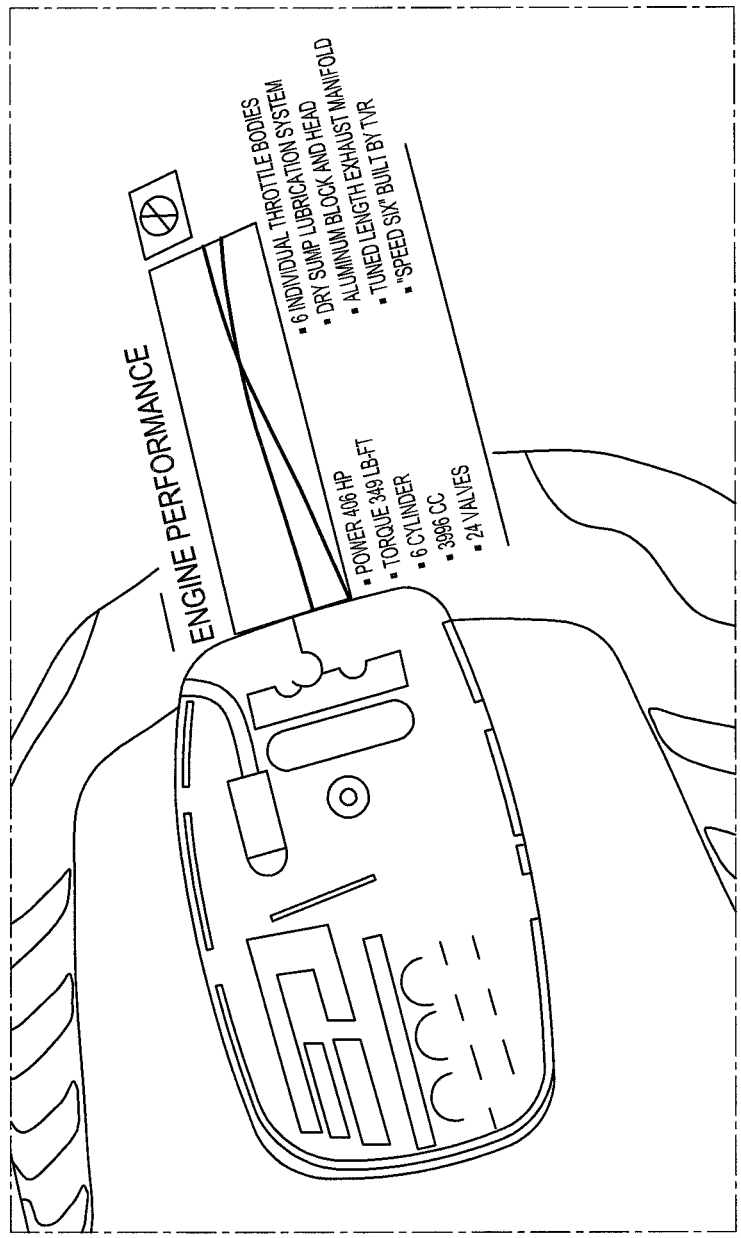
FIG. 2 illustrates an exemplary display of a virtual vehicle.
Figure 3:
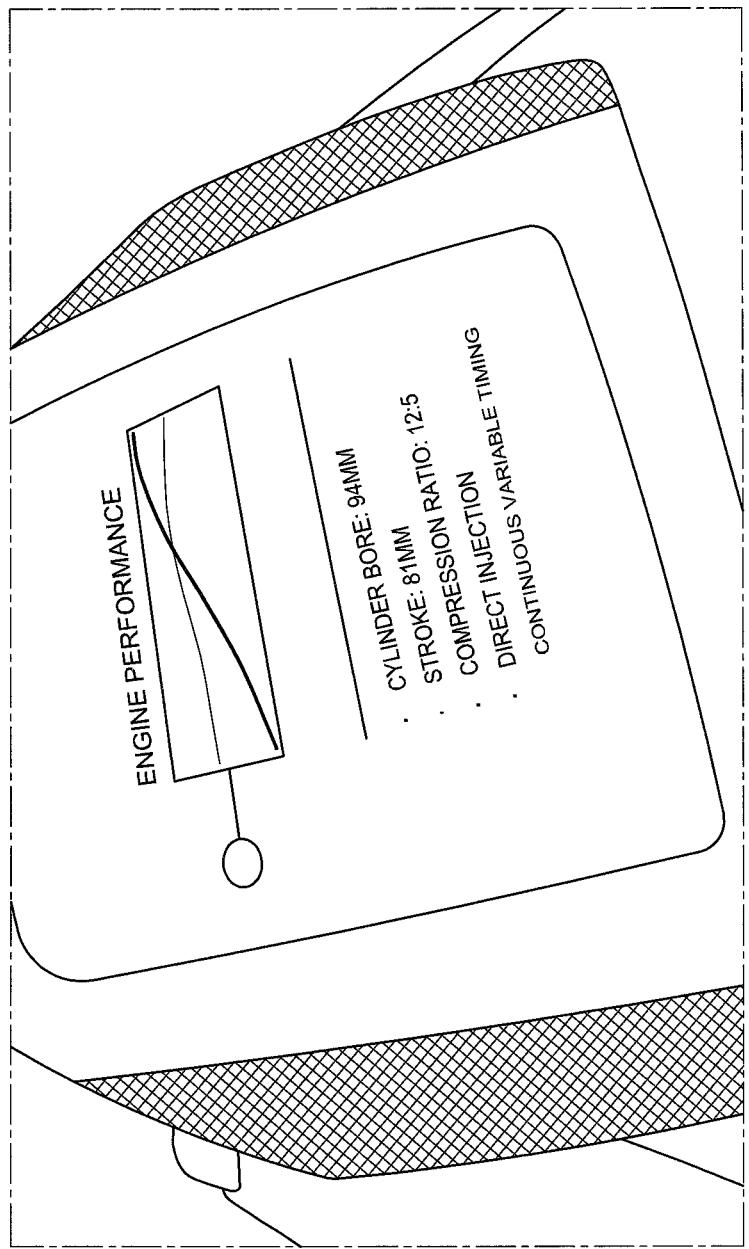
FIG. 3 illustrates another exemplary display of a virtual vehicle.

Referring now to the drawings, and more particularly to FIGS. 4-11 there are shown exemplary embodiments of the method and structures according to the present invention.

Figure 4:
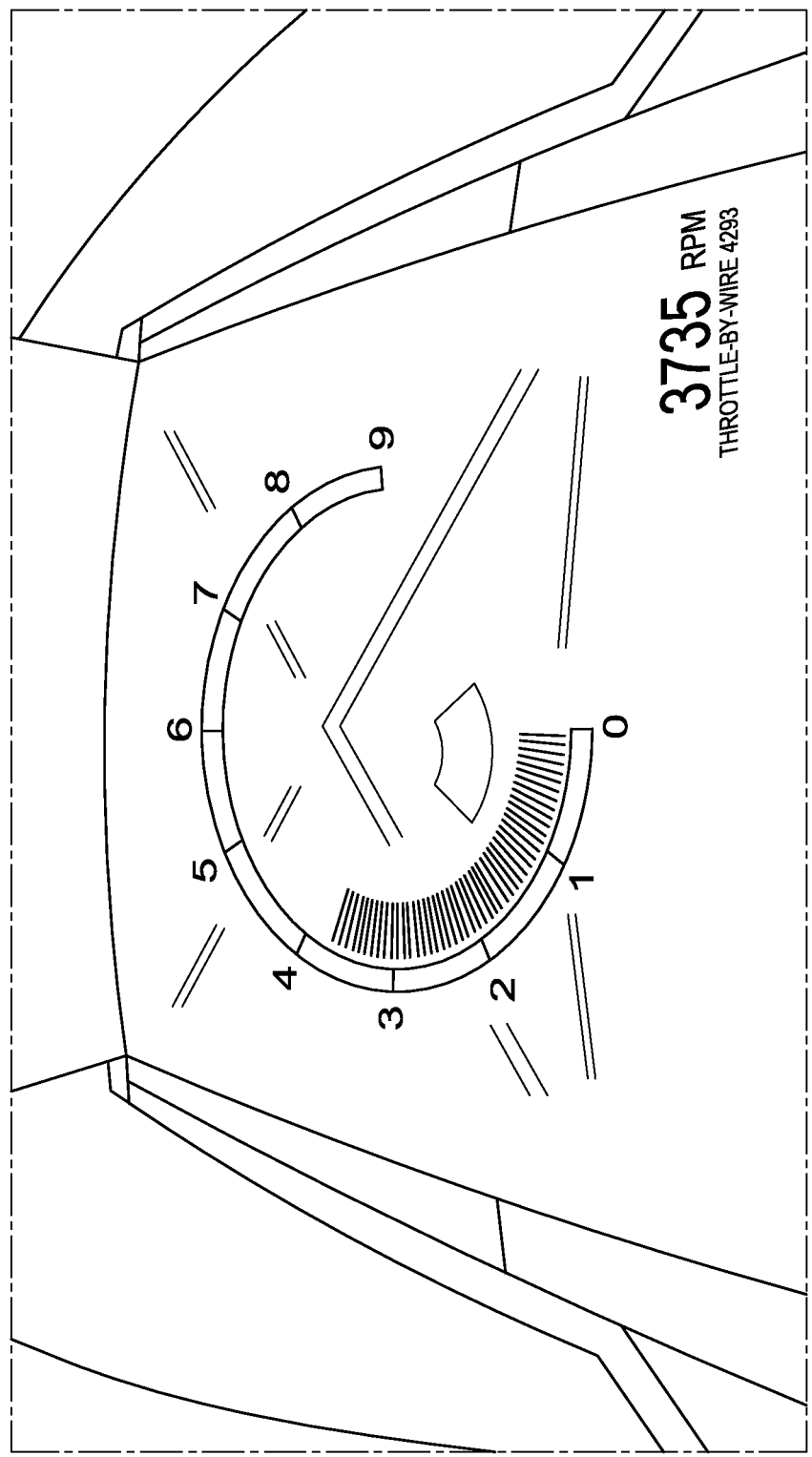
FIG. 4 illustrates an exemplary embodiment of an interactive graphical interface.

The present system and method enhances a vehicle showcase for both the owner and vehicle enthusiasts by augmenting the engine bay with a graphical interface that is interacted with through user gestures. FIG. 4 illustrates an exemplary embodiment of an interactive graphical interface. In the embodiment illustrated in FIG. 4, a tachometer is displayed on an engine of a vehicle. The information displayed on the engine is not, however, limited to a tachometer, as illustrated in FIG. 4. Indeed, different types of information augmentation can allow the content displayed to be tailored to specific needs of the enthusiast/vehicle owner to learn more about how the engine works. Additionally, the content displayed on the engine can also provide diagnostic information to the owner and/or a vehicle technician. Specifically, the content can include real-time fluid levels, system temperatures, and service reminders. For example, oil temperature, oil pressure, and any warnings of low oil can be displayed directly on or next to the cap where oil is added, the oil filter, and/or the oil level dipstick. Furthermore, the system (and method) can be configured to provide maintenance and emergency tutorials, such as how to manually check the oil level or how to properly jump start a vehicle.

The system (and method) is configured to read diagnostic data about the status of a vehicle's systems (e.g., via controller area network bus (CANbus)), display the information (e.g., directly) on the surface of the engine and/or its surrounding panels, and accept gesture input from a user in order to manipulate the content of the displayed information. In addition, the system can display stored information and media that explains to users how the engine operates or acts as a reference tool.

Figure 5:
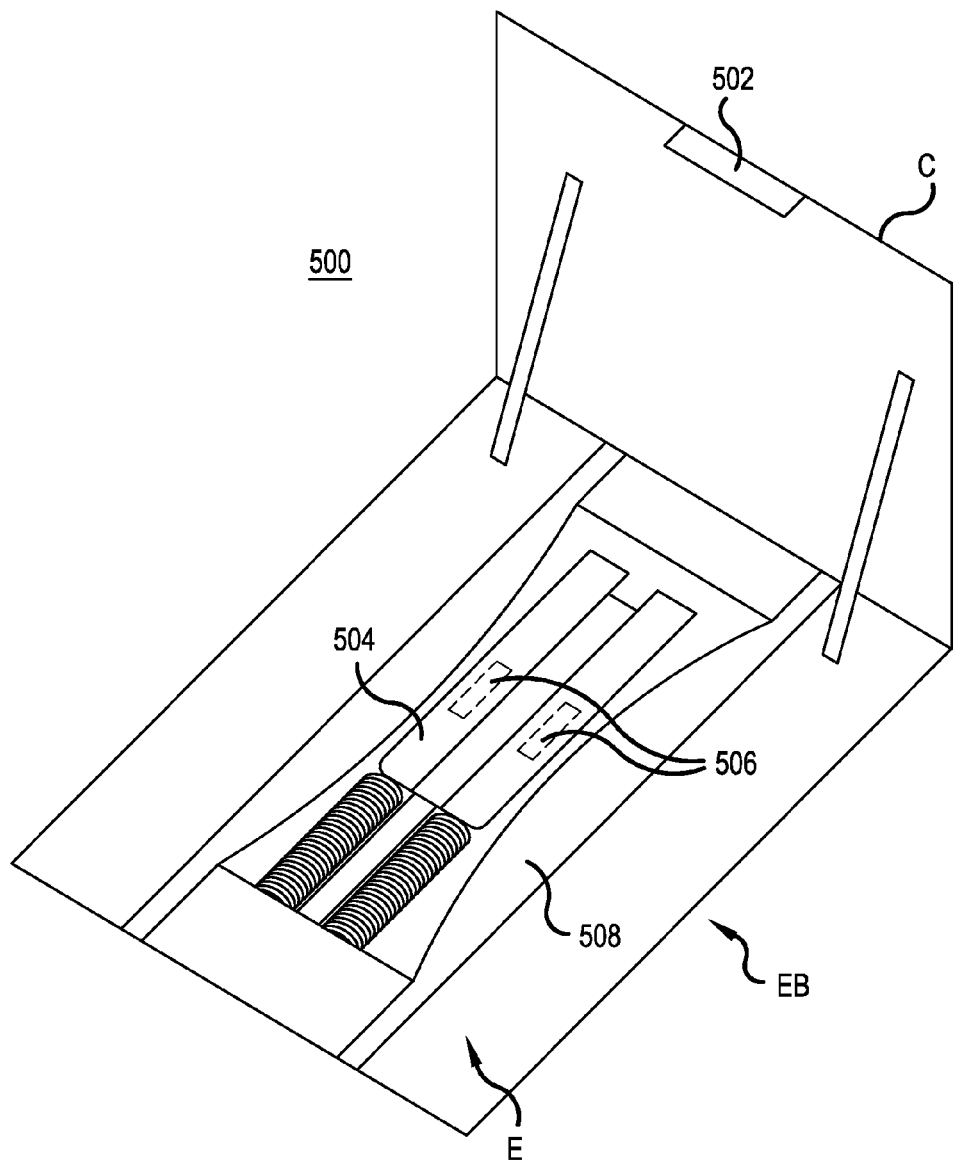
FIG. 5 illustrates an exemplary configuration of a system 500 according to certain exemplary embodiments of the present invention.

FIG. 5 illustrates an exemplary configuration of a system 500 according to certain exemplary embodiments of the present invention. The system 500 may be incorporated into an engine bay EB of a vehicle. FIG. 5 illustrates such an engine bay EB of a vehicle with the cover C (e.g., hood) of the engine bay EB in an open position. When the over C is in the open position, the engine E contained within the engine bay EB is accessible.

The system 500 includes an interactive graphical interface 502. In the embodiment illustrated in FIG. 5, the interactive graphical interface is a projector 502 positioned along the cover C. In the embodiment illustrated in FIG. 5, a single projector 502 is positioned along a center portion of a front edge of the cover C. The projector 502, however, is not limited to the specific position illustrated in FIG. 5. Indeed, the projector 502 may be positioned anywhere along the edges and inside surface of the cover C. Furthermore, the projector may also be positioned on any suitable surface within the engine bay EB. Moreover, the system 500 may include more than one projector positioned on the cover and/or within the engine bay.

The system 500 includes an engine bay cover 504 covering the engine E. The engine bay cover 504 may also cover the panels 508 surrounding the engine E within the engine bay EB. The engine bay cover 504 illustrated in FIG. 5 includes a plastic engine cover that is painted with matte grey color to allow the projector 502 to display an image on the engine bay cover 504. The engine bay cover 504 is not limited to the specific material and/or color described above. Indeed, the engine bay cover 504 may include any suitable cover that will allow an image from the projector 502 to be visibly displayed on the engine E. The projector 502 includes, for example, a digital projector. Again, however, any other suitable projector 502 may be used.

The system 500 further includes one or more sensors 506 configured to receive user gesture input. In the embodiment illustrated in FIG. 5, the sensors 506 are positioned on the engine E beneath the engine bay cover 504. It is noted, however, that the number and placement of the sensors 506 is not limited to the configuration illustrated in FIG. 5. Indeed, any number of sensors may be used and positioned in a suitable position throughout the engine bay EB. The sensors 506 may include, for example, capacitive proximity sensors that can sense when a user gestures (e.g., with a hand, or pointer object, etc.) near the sensors to allow the user to select components of the engine E without actually contacting the engine E. Additionally, the sensors may be replaced with other gesture sensing technologies including, but not limited to, camera-based, infrared, and other suitable gesture sensing technologies.

Figure 6:
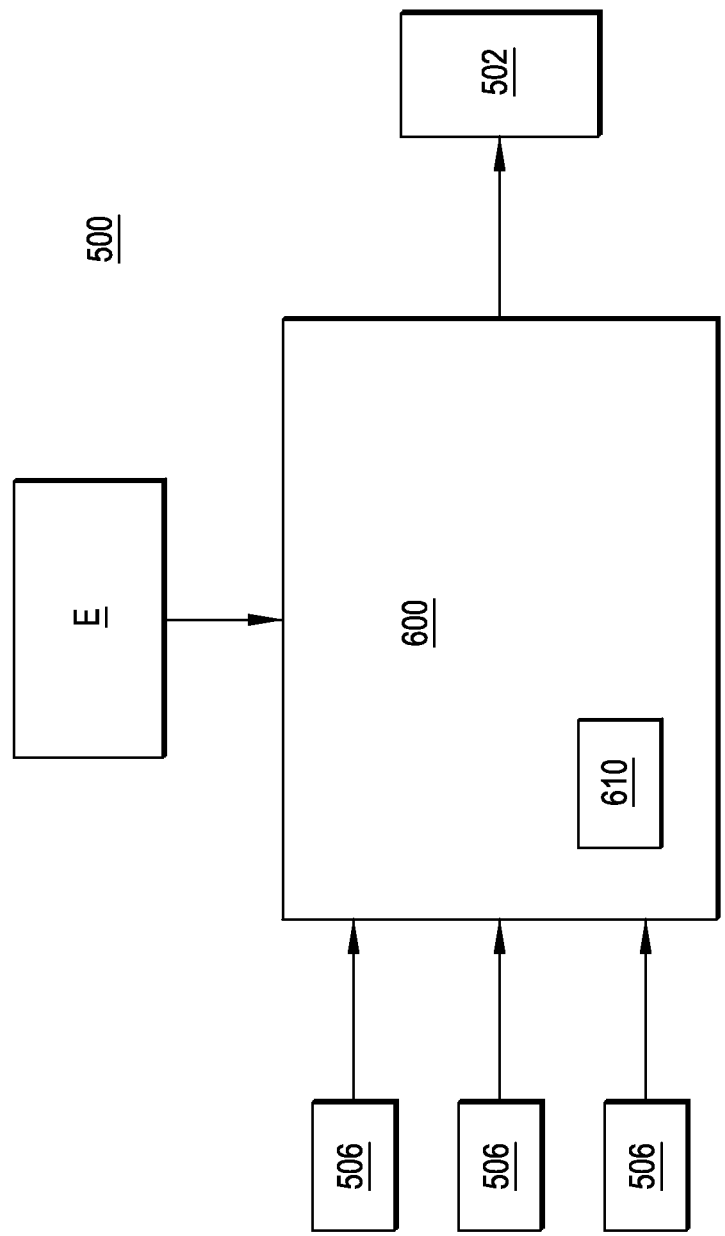
FIG. 6 illustrates a block diagram of the system 500 according to certain exemplary embodiments of the present invention.

FIG. 6 illustrates a block diagram of the system 500 according to certain exemplary embodiments of the present invention. As detailed above, the system 600 includes a projector 502 and one or more sensors 506. Additionally, the system includes a control unit 600 configured to send and receive information to and from the other components of the system 500 as well as to control the other components of the system 500. The control unit 600 may include a central processing unit (CPU) (as is detailed below) or may be incorporated into the overall system of the vehicle.

The control unit 600 is configured to receive vehicle system information from the engine E. For example, the control unit 600 may receive general information regarding engine components, information regarding the current status of the engine components, and/or engine diagnostic information, etc. The information received from the engine E may be immediately transferred to the other components of the system (e.g., the projector 502) or may be stored in a database/storage unit 610. In the embodiment illustrated in FIG. 6, the database/storage unit 610 is incorporated in the control unit. Alternatively, the database/storage unit 610 may be incorporated into the overall vehicle system or in an external storage unit.

Figure 9:
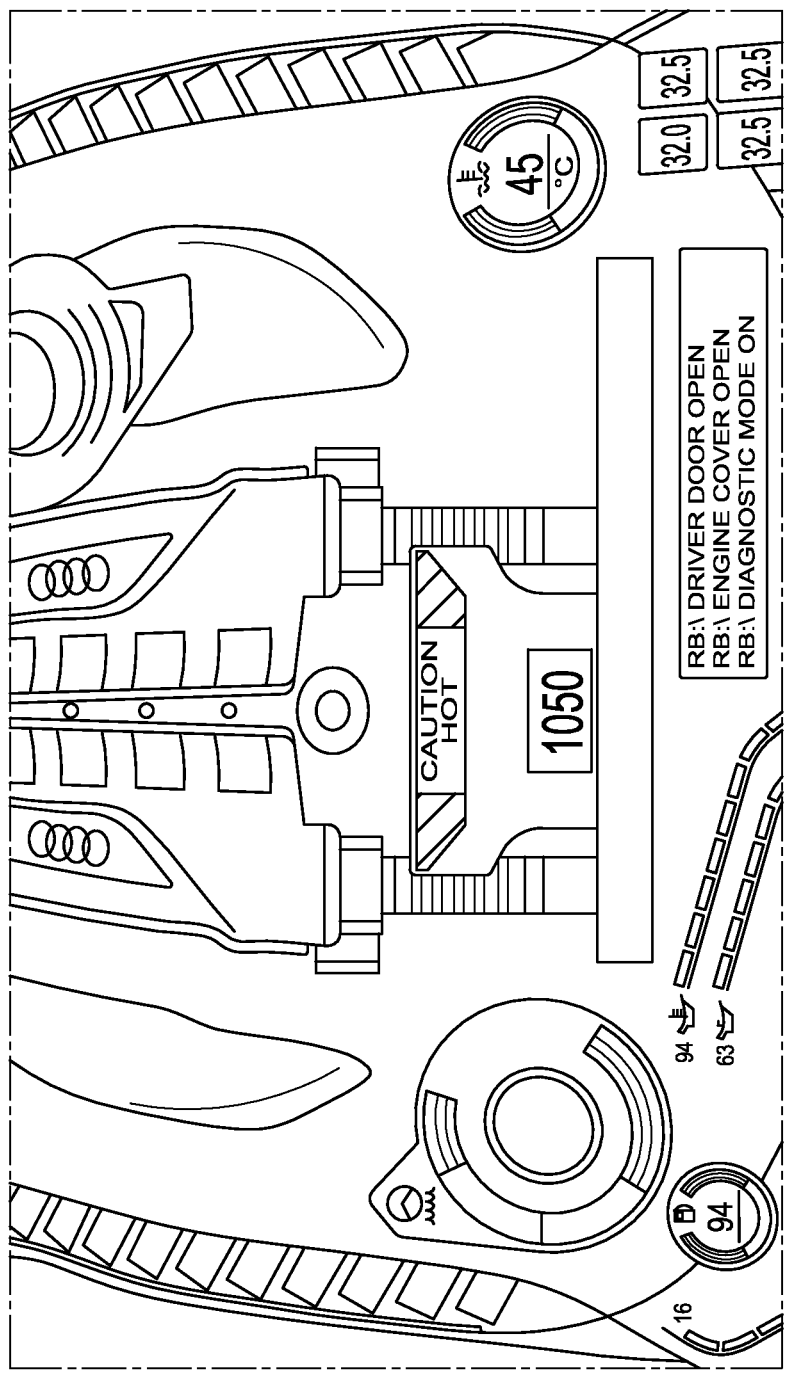
FIG. 9 illustrates an example of a real-time augmentation displayed on the vehicle engine E.

The control unit 600 is configured to receive information from the engine E and transfer the received information (or information previously stored within the database/storage unit 610) to the projector 502, which displays the information on the engine bay cover 504. FIG. 9 illustrates an example of a real-time augmentation displayed on the vehicle engine E.

Figure 7:
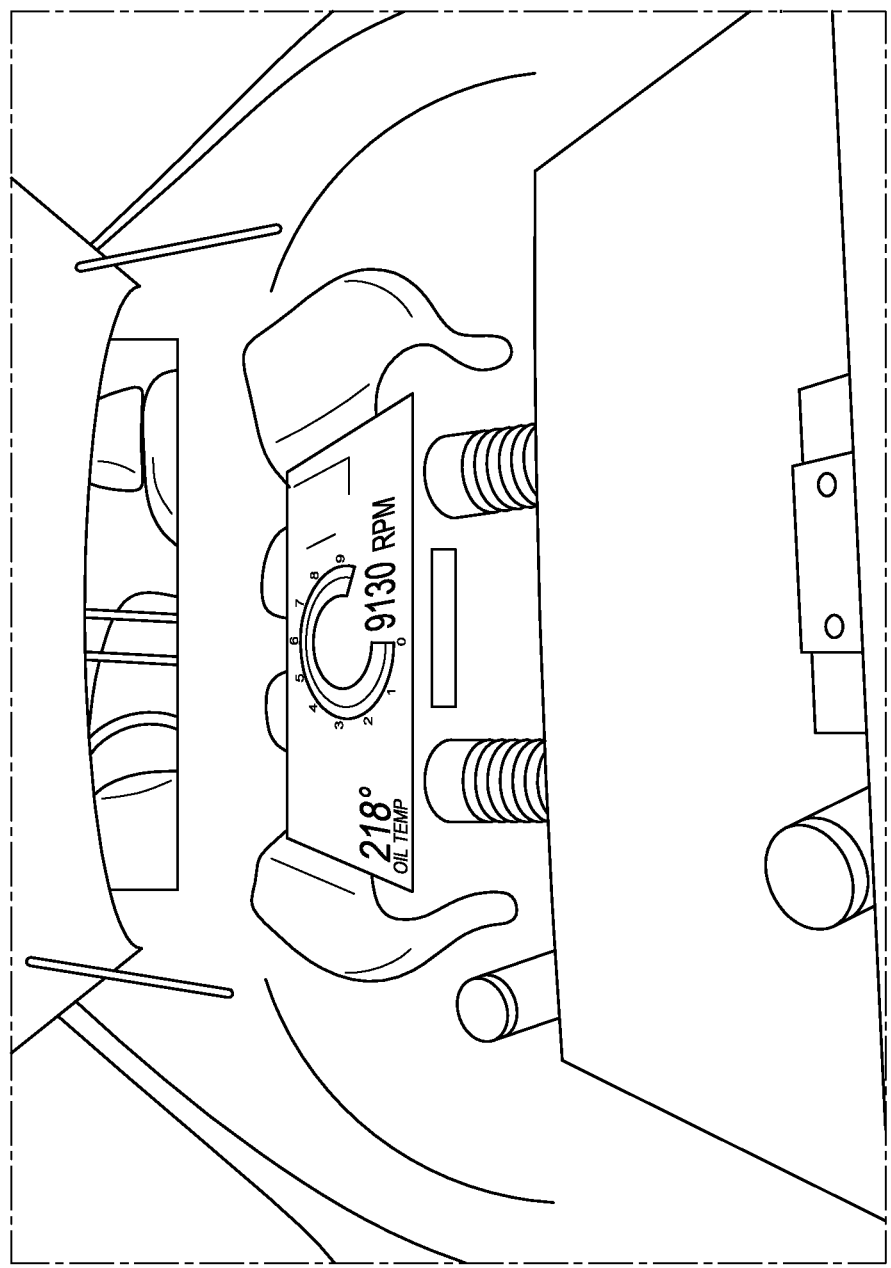
FIG. 7 illustrates an additional exemplary embodiment of the present system.

FIG. 7 illustrates an additional exemplary embodiment of the present system. In the embodiment illustrated in FIG. 7, the projector 502 is replaced with an organic light-emitting diode (OLED) 702 display above the engine E. For example the OLED may include a segmented, transparent OLED. The OLED technology provides the advantage of being visible outdoors, which is useful in the case of outdoor car shows.

The information projected on the vehicle's surface, for example the engine, could be displayed using any suitable display technology, like LCD, plasma displays or electronic paper (e.g., gyricon display technology—writeable and eraseable transparent plastic sheet display technology), etc. Electronic paper has the advantage that it can hold static text and images without electricity. Electronic paper could be used to display more static information, which does not need to be updated quickly. Electronic paper has the additional advantage of not using electric energy while displaying the content. In order to allow easy reading of the display's content, the display's brightness could be adapted automatically by sensing ambient light with at least one light sensor.

Additionally, other exemplary embodiments of the system may include an augmented reality application for a table or smartphone. In such an application, a graphical augmentation is virtually overlaid on a live image of the engine.

A software application (e.g., an Adobe Flash® based system) is used with the above system. The software components may be incorporated with the hardware components (e.g., the control unit 600). The control unit 600, in conjunction with the software application, accepts inputs from the sensors 506, similar to sensing keys on a keyboard. In this manner, the user is able to move between different modes and interact with displayed content within the modes. The control unit 600 receives the input gestures sensed by the sensors 506. Based on the input gestures from the users, different real-time information is displayed (and manipulated) in the engine bay EB.

Figure 8:
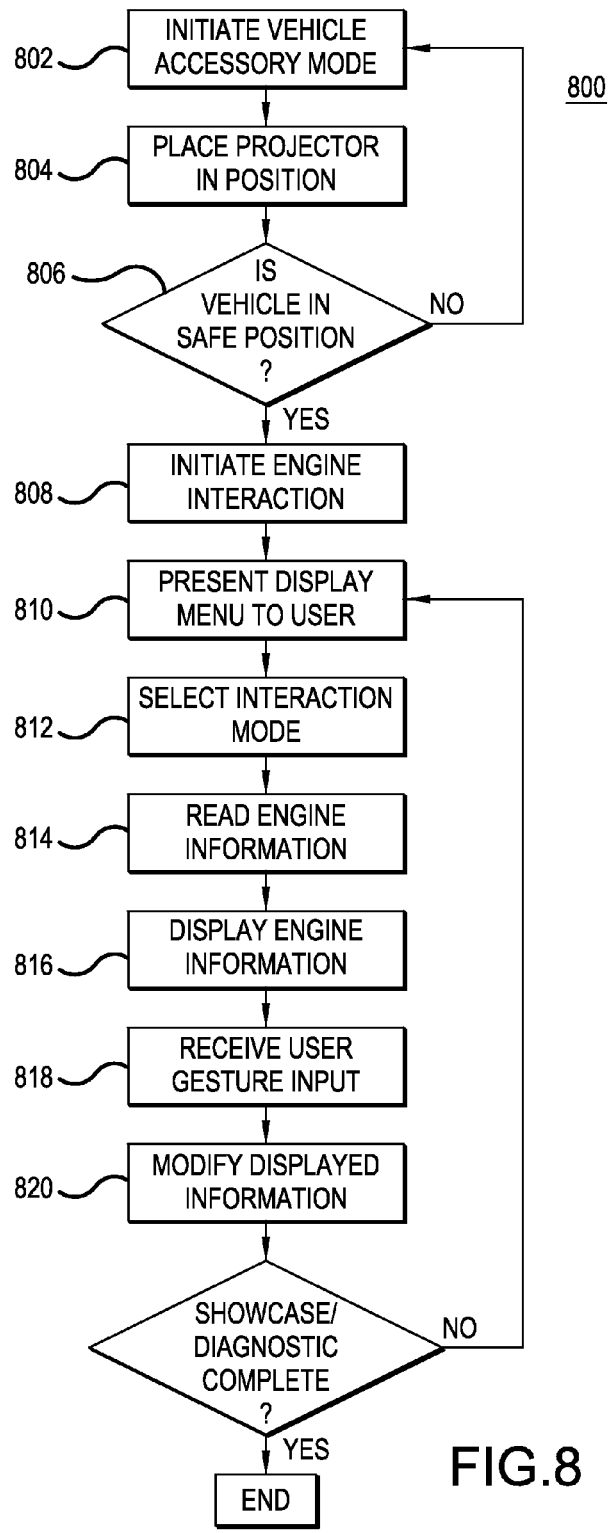
FIG. 8 illustrates a flow diagram of a method 800 according to certain exemplary embodiments of the present invention.

FIG. 8 illustrates a flow diagram of a method 800 according to certain exemplary embodiments of the present invention. To begin the method 800 using the present interactive engine system, a user places a key in the vehicle ignition, turns the accessory mode on, and then leaves the vehicle transmission in park (or neutral) with the parking brake engaged (802). The user then opens the cover C, which places the projector 502 into position above the engine E (804). Once the projector is in position, the boot-up sequence of the system begins. An accelerometer reading detects if the car is parked on too great of an incline, which would make it unsafe to have the transmission in neutral (806). If the parking situation is determined to be safe, then the engine interaction system will boot-up (808). If not, then the user must reposition the vehicle.

From the boot-up, the user will be able to select a menu by placing his hands close to the sensors 506 positioned in the engine bay EB. That is, after a visualized boot-up diagnostic, a menu screen, displaying a menu listing one or more showcasing modes, is presented to the user (810). The modes are configured to cater to different types of users (e.g., owner, enthusiast, technician, etc.) that would be interested in the engine E. The different modes may include, for example, an instrument mode, a tutorial mode, a maintenance mode, and a learning mode. It is noted that the listed modes are merely non-limiting examples of the types of modes that may be displayed on the menu screen.

Figure 10:
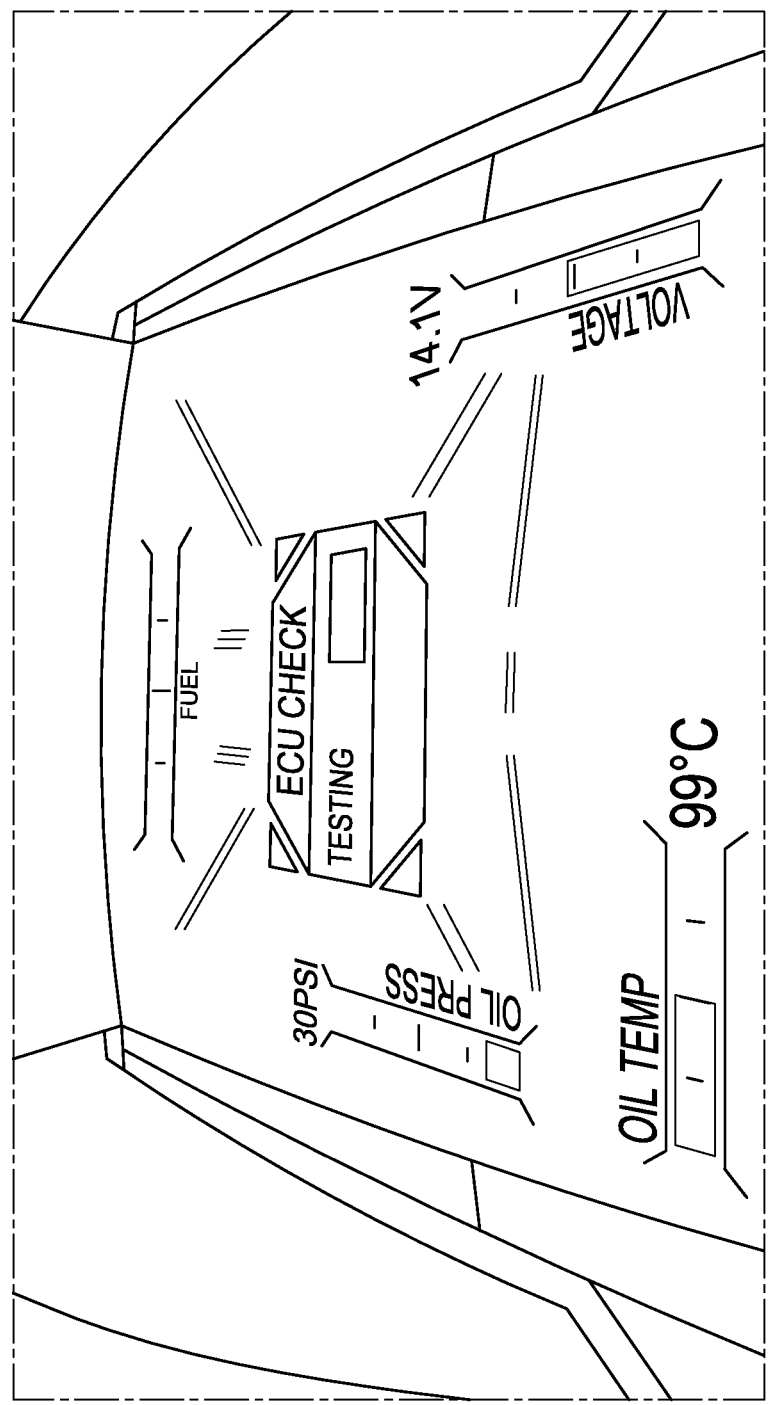
FIG. 10 illustrates an example display when the system is in the instrument mode.

In the instrument mode, a tachometer may be overlaid over the engine E while it revs. Additionally, as is illustrated in FIG. 10, all pertinent dash diagnostics may be overlaid on the engine such as, for example, oil pressure and temperature. Control over the engine E starting and the ability to rev the throttle are important features when showcasing the vehicle.

The tutorial mode provides step-by-step instructions in critical basic situations like, for example, jump starting a car, checking fluid levels, changing engine oil, etc. Additionally, the tutorial mode can provide step-by-step instructions for advanced maintenance procedures for technicians.

In the maintenance mode, the system may display answers to specific maintenance questions. For example, information regarding the remaining percentage of clutch life, the number of miles before the next oil change, the date of an upcoming vehicle inspection, etc.

Figure 11:
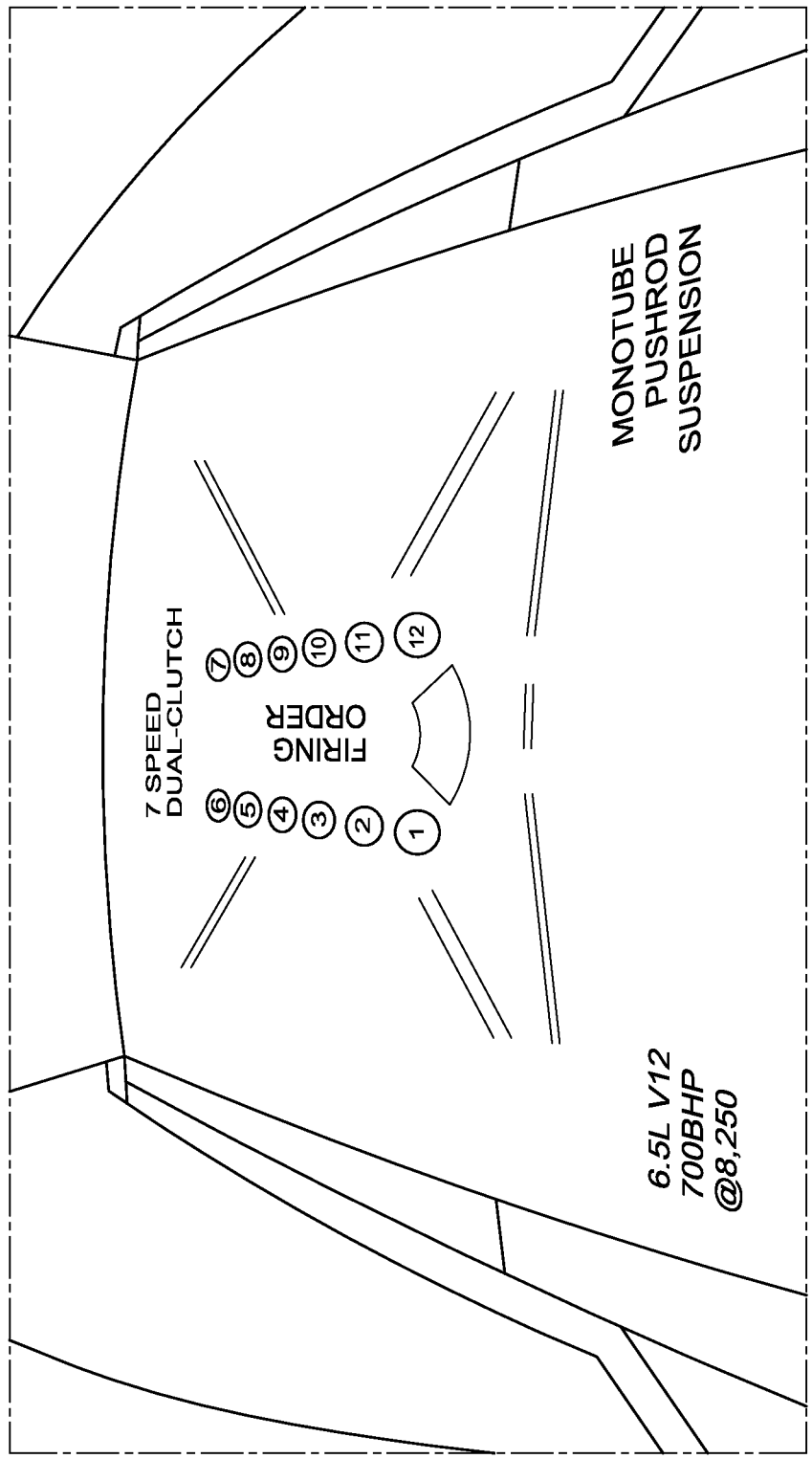
FIG. 11 illustrates an example display when the system is in the learning mode.

FIG. 11 illustrates an example display when the system is in the learning mode. In the learning mode, the system may present information to explain how certain components of the engine operate. For example, in the learning mode, the system may explain how air enters the engine and exhaust exits the engine, what type of engine is in the vehicle, etc. For example, the system may display information regarding air flow through the engine. Animated arrows may be displayed to illustrate the locations and flow path of airflow through the engine. The example illustrated in FIG. 11 illustrates the firing order of cylinders in the engine E.

The user, having been presented with the display mode menu, selects a desired interaction mode (812). The system reads the engine information, either by receiving the information from the engine E or by obtaining stored information from the database/storage unit 610, specifically related to the selected interaction mode (814). The obtained information is then displayed (816) to the user using the projector 502 (or other graphical display devices).

Once the information is displayed (e.g., displayed on the engine or panels within the engine bay) the user is able to interact with the system. As detailed above, the system will receive, through the sensor 506, user gesture input (818). The system then modifies the displayed content (820) based on the detected user gesture input. If the showcase/diagnostics is complete, then the process ends. Otherwise, the process is repeated allowing further user input (822).

The method (and the control unit 600) of the invention may be implemented in a typical computer hardware configuration, which may be incorporated into the vehicle. Additionally, a different aspect of the invention includes a computer-implemented method for performing at least certain steps in the above method. Such a method may be implemented, for example, by operating a computer, as embodied by a digital data processing apparatus, to execute a sequence of machine-readable instructions. These instructions may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

Certain applications of the invention are directed specifically to showcasing a vehicle. As explained above, the interactive engine system (and method) can also be used as a diagnostic tool. For example, the tutorial and maintenance modes serve to distinguish the present system (and method) as a purposeful and functional application for those working on the car while the application is running. The system is able to assist technicians by displaying critical diagnostic information directly where they are looking as well as search databases for pertinent service information that the technician would otherwise have to research on an external computer or in a manual.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system, comprising:
   a control unit configured to read information of a vehicle system;
   a projector configured to display the information on a surface of a vehicle; and
   a sensor configured to receive gesture input from a user, wherein the information displayed on the surface of the vehicle is manipulatable based on the gesture input, and wherein the surface of the vehicle comprises an engine.

2. The system according to claim 1, wherein the projector is disposed along an edge of a hood openably positioned over an engine bay of the vehicle.

3. The system according to claim 1, further comprising a cover disposed over the surface of the vehicle, the cover being configured to allow the information from the projector to be visibly displayed.

4. The system according to claim 1, wherein the sensor comprises a capacitive proximity sensor.

5. The system according to claim 1, wherein the interactive graphical interface comprises:
   a cover disposed over a portion of a vehicle.

6. A vehicle, comprising the system according to claim 1.

7. The system according to claim 3, wherein the sensor is disposed beneath the cover.

8. A system, comprising:
   an interactive graphical interface configured to display information of a vehicle system, the interactive graphical interface comprising:
      a cover portion of a vehicle; and
      a projector configured to display the information on the cover; and
   a sensor configured to receive gesture input from a user, wherein the information displayed is manipulatable based on the gesture input, and
   wherein the portion of the vehicle comprises an engine.

9. A method, comprising:
   reading information of a vehicle system through a control unit;
   displaying the information on a surface of the vehicle;
   accepting gesture input from a user; and
   manipulating the information displayed on the surface based on the gesture input,
   wherein the surface of the vehicle comprises a surface of an engine of the vehicle.

10. A method, comprising:
    reading information of a vehicle system through a control unit;
    displaying the information on a surface of the vehicle;
    accepting gesture input from a user; and
    manipulating the information displayed on the surface based on the gesture input,
    wherein the surface of the vehicle comprises a surface within a vehicle engine bay.

11. The method according to claim 10, further comprising presenting an interactive menu to the user, the menu comprising one or more selectable interaction modes.

12. The method according to claim 10, wherein said accepting gesture input from a user comprises detecting a presence and movement of a body part of the user over the surface of the vehicle.

13. The method according to claim 10, wherein said displaying the information on a surface of the vehicle comprises projecting the information using a projector.

14. The method according to claim 11, wherein a content of the information displayed is determined based on an interaction mode selected from the interactive menu.

* * * * *